United States Patent
Kumagai et al.

(10) Patent No.: US 9,599,211 B2
(45) Date of Patent: Mar. 21, 2017

(54) LUBRICATION STRUCTURE FOR TRANSMISSION

(71) Applicant: HONDA MOTOR CO., LTD., Tokyo (JP)

(72) Inventors: Nobuhiro Kumagai, Wako (JP); Takeshi Uchino, Wako (JP); Shin Fukasawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 208 days.

(21) Appl. No.: 14/551,294

(22) Filed: Nov. 24, 2014

(65) Prior Publication Data

US 2015/0176695 A1 Jun. 25, 2015

(30) Foreign Application Priority Data

Dec. 24, 2013 (JP) .................................. 2013-265722

(51) Int. Cl.
*F16H 57/00* (2012.01)
*F16H 57/04* (2010.01)

(52) U.S. Cl.
CPC ....... *F16H 57/042* (2013.01); *F16H 57/0471* (2013.01); *F16H 57/0473* (2013.01); *F16H 57/0498* (2013.01); *Y10T 74/19614* (2015.01)

(58) Field of Classification Search
CPC ............... F16H 57/042; F16H 57/0424; F16H 57/0471; F16H 57/0473; F16H 57/0498;

(Continued)

(56) References Cited

U.S. PATENT DOCUMENTS

| | | | | |
|---|---|---|---|---|
| 5,860,885 A | * | 1/1999 | Mizuta | ................ F16H 63/3026 475/116 |
| 6,041,904 A | * | 3/2000 | Kuroda | .................. B60K 17/35 192/113.34 |

(Continued)

FOREIGN PATENT DOCUMENTS

| | | |
|---|---|---|
| CN | 101061333 A | 10/2007 |
| CN | 101629625 A | 1/2010 |

(Continued)

OTHER PUBLICATIONS

Office Action dated Aug. 29, 2016, issued in counterpart Chinese Patent Application No. 201410743424.7, with English translation. (12 pages).

*Primary Examiner* — Victor MacArthur
(74) *Attorney, Agent, or Firm* — Westerman, Hattori, Daniels & Adrian, LLP

(57) ABSTRACT

In a transmission, an inner end portion in a radial direction of a washer abuts on an inner race of a first bearing, and a seal surface provided on an outer end in the radial direction of the washer abuts on an outer race of a second bearing. Therefore, load in an axial direction which acts on a second gear can be supported with a second rotary shaft via the outer race of the second bearing, the washer and the inner race of the first bearing. Additionally, on a side surface at the second bearing side, of the washer, a lubricating oil guide surface is formed, that guides lubricating oil which is supplied from an inside of a second rotary shaft, to a one-way clutch through the second bearing, and therefore, a lubricating effect can be enhanced by efficiently supplying the oil to the second bearing and the clutch.

5 Claims, 2 Drawing Sheets

(58) Field of Classification Search
CPC .. F16H 57/043; F16H 57/0431; F15H 57/428; Y10T 74/19614
USPC ......... 74/640, 467; 475/159; 464/7; 384/462
See application file for complete search history.

(56) References Cited

U.S. PATENT DOCUMENTS

| | | | | |
|---|---|---|---|---|
| 6,059,682 | A * | 5/2000 | Friedmann | F16D 13/72 475/159 |
| 6,488,137 | B2 * | 12/2002 | Katou | F16D 27/115 192/113.35 |
| 6,540,638 | B2 * | 4/2003 | Sulzmann | F16H 3/60 475/159 |
| 8,845,473 | B2 * | 9/2014 | Nett | F16H 57/0409 475/159 |
| 8,905,894 | B2 * | 12/2014 | Koyama | F16H 57/082 475/159 |
| 9,068,614 | B2 * | 6/2015 | Andersson | E02F 9/2083 |
| 2015/0176695 | A1 * | 6/2015 | Kumagai | F16H 57/042 74/405 |

FOREIGN PATENT DOCUMENTS

| | | |
|---|---|---|
| CN | 101657657 A | 2/2010 |
| CN | 201714553 U | 1/2011 |
| CN | 202732909 U | 2/2013 |
| JP | 64-40745 | 2/1989 |
| JP | 3-62259 U | 6/1991 |
| JP | 7-217709 A | 8/1995 |
| WO | 2013094044 A1 | 6/2013 |

* cited by examiner

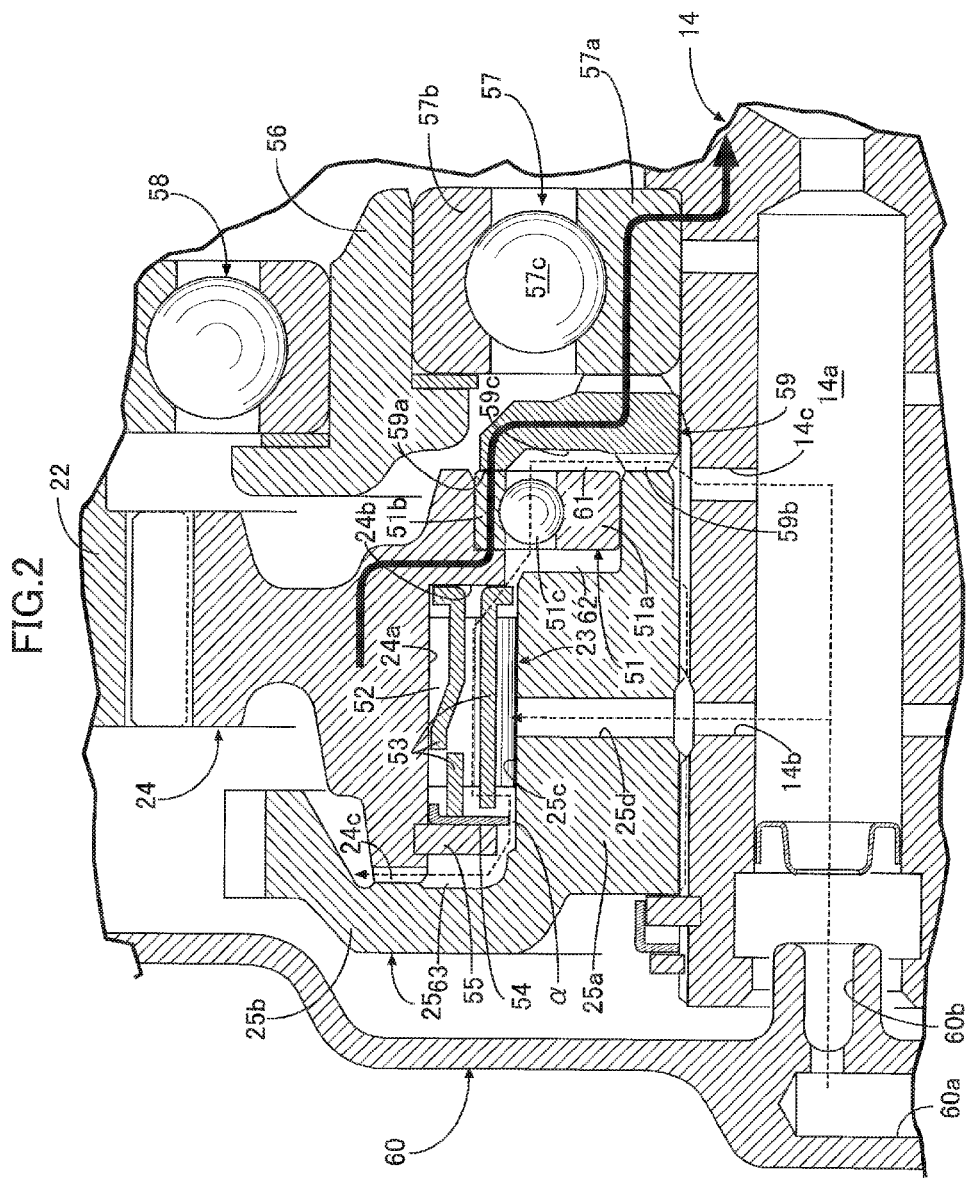

LUBRICATION STRUCTURE FOR TRANSMISSION

BACKGROUND OF THE INVENTION

Field of the Invention

The present invention relates to a lubrication structure for a transmission, comprising: a first rotary shaft supporting a first gear; a second rotary shaft supporting a second gear that is meshed with the first gear via a one-way clutch; a first bearing supporting the second rotary shaft, at a casing; a second bearing supporting the second gear, at the second rotary shaft, between the one-way clutch and the first bearing; and a washer supported on an outer periphery of the second rotary shaft and interposed between the first bearing and the second bearing.

Description of the Related Art

Japanese Utility Model Publication No. 2-23893 has made known a structure which supports thrust load applied to an outer race of a one-way clutch, which supports a stator vane of a torque converter of a transmission at a stator shaft, by transmitting the thrust load to an inner race of the ball bearing which supports a pump impeller at the stator shaft, by the route from the outer race to a washer (a retainer) to a thrust bearing to the inner race.

SUMMARY OF THE INVENTION

Incidentally, the one-way clutch described in Japanese Utility Model Publication No. 2-23893 is disposed inside the torque convertor which is filled with lubricating oil (working oil), and therefore, can be lubricated without providing special supply means of the lubricating oil.

However, when a gear is supported at the rotary shaft of the transmission via the one-way clutch, and the one-way clutch is lubricated with lubricating oil which is supplied from an inside of the rotary shaft, a lubrication effect needs to be enhanced by positively guiding the lubricating oil to the one-way clutch.

The present invention is made in the light of the aforementioned circumstances, and has an object to effectively lubricate a one-way clutch that is supported at an outer periphery of a rotary shaft of a transmission, with lubricating oil that is supplied from an inside of the rotary shaft.

In order to achieve the object, according to a first feature of the present invention, there is provided a lubrication structure for a transmission, comprising: a first rotary shaft supporting a first gear; a second rotary shaft supporting a second gear that is meshed with the first gear via a one-way clutch; a first bearing supporting the second rotary shaft, at a casing; a second bearing supporting the second gear, at the second rotary shaft, between the one-way clutch and the first bearing; and a washer supported on an outer periphery of the second rotary shaft and interposed between the first bearing and the second bearing, wherein an inner end portion in a radial direction of the washer is caused to abut on an inner race of the first bearing, a seal surface provided on an outer end in the radial direction of the washer is caused to abut on an outer race of the second bearing, and on a side surface at the second bearing side of the washer, a lubricating oil guide surface is formed, that guides lubricating oil which is supplied from an inside of the second rotary shaft, to the one-way clutch through the second bearing.

According to the first feature of the present invention, the transmission includes the first rotary shaft supporting the first gear, the second rotary shaft supporting the second gear that is meshed with the first gear via the one-way clutch, the first bearing supporting the second rotary shaft, at the casing, the second bearing supporting the second gear, at the second rotary shaft, between the one-way clutch and the first bearing, and the washer supported on the outer periphery of the second rotary shaft and interposed between the first bearing and the second bearing. The inner end portion in the radial direction of the washer is caused to abut on the inner race of the first bearing, and the seal surface provided on the outer end in the radial direction of the washer is caused to abut on the outer race of the second bearing. Therefore, load in an axial direction which acts on the second gear can be firmly supported with the second rotary shaft via the outer race of the second bearing, the washer and the inner race of the first bearing. In addition to this, on the side surface at the second bearing side, of the washer, the lubricating oil guide surface is formed, that guides the lubricating oil which is supplied from the inside of the second rotary shaft, to the one-way clutch through the second bearing, and therefore, a lubricating effect can be enhanced by efficiently supplying the lubricating oil to the second bearing and the one-way clutch.

According to a second feature of the present invention, in addition to the first feature, the first gear and the second gear are helical gears, and with meshing reaction force in an axial direction which is exerted on the second gear from the first gear, the outer race of the second bearing is urged toward the seal surface of the washer.

According to the second feature of the present invention, the first gear and the second gear are helical gears, and with the meshing reaction force in the axial direction which is exerted on the second gear from the first gear, the outer race of the second bearing is urged toward the seal surface of the washer. Therefore, when the load on the one-way clutch is increased in order to transmit large torque between the first and the second rotary shafts, the outer race of the second bearing and the seal surface of the washer are brought into close contact with each other with the meshing reaction force to prevent leakage of the lubricating oil, whereby reliable lubrication of the one-way clutch can be enabled.

According to a third feature of the present invention, in addition to the first or second feature, a cutout guiding the lubricating oil, which is supplied from the inside of the second rotary shaft, to the lubricating oil guide surface is formed at an inner end portion in a radial direction of the washer, an end portion of the one-way clutch at a side opposite from the second bearing is blocked with a blocking plate, and a gap for discharging the lubricating oil is formed at an inner end portion in a radial direction of the blocking plate.

According to the third feature of the present invention, the cutout guiding the lubricating oil, which is supplied from the inside of the second rotary shaft, to the lubricating oil guide surface is formed at the inner end portion in the radial direction of the washer, the end portion of the one-way clutch at the side opposite from the second bearing is blocked with the blocking plate, and the gap for discharging the lubricating oil is formed at the inner end portion in the radial direction of the blocking plate. Therefore, the lubricating oil can be held between the cutout which is located at an inner side in the radial direction of the one-way clutch and the gap, against centrifugal force, and the lubrication effect of the one-way clutch is enhanced.

According to a fourth feature of the present invention, in addition to the first feature, there is provided the lubrication structure for a transmission further comprising: a parking gear with a boss portion fixed to the second rotary shaft, wherein the one-way clutch is disposed between an outer peripheral surface of the boss portion and an inner peripheral surface of the second gear.

According to the fourth feature of the present invention, the parking gear with the boss portion fixed to the second rotary shaft is included, and the one-way clutch is disposed between the outer peripheral surface of the boss portion and the inner peripheral surface of the second gear. Therefore, an outside diameter of the one-way clutch is enlarged correspondingly to the boss portion, and torque transmission capacity and durability can be increased.

Note that a main shaft 12 of an embodiment corresponds to the first rotary shaft of the present invention, a countershaft 14 of the embodiment corresponds to the second rotary shaft of the present invention, a first speed drive gear 22 of the embodiment corresponds to the first gear of the present invention, a first driven gear 24 of the embodiment corresponds to the second gear of the present invention, a ball bearing 51 of the embodiment corresponds to the second bearing of the present invention, and a ball bearing 57 of the embodiment corresponds to the first bearing of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 2 is an enlarged detailed view of part 2 in FIG. 1.

DESCRIPTION OF THE PREFERRED EMBODIMENT

Figure 1:
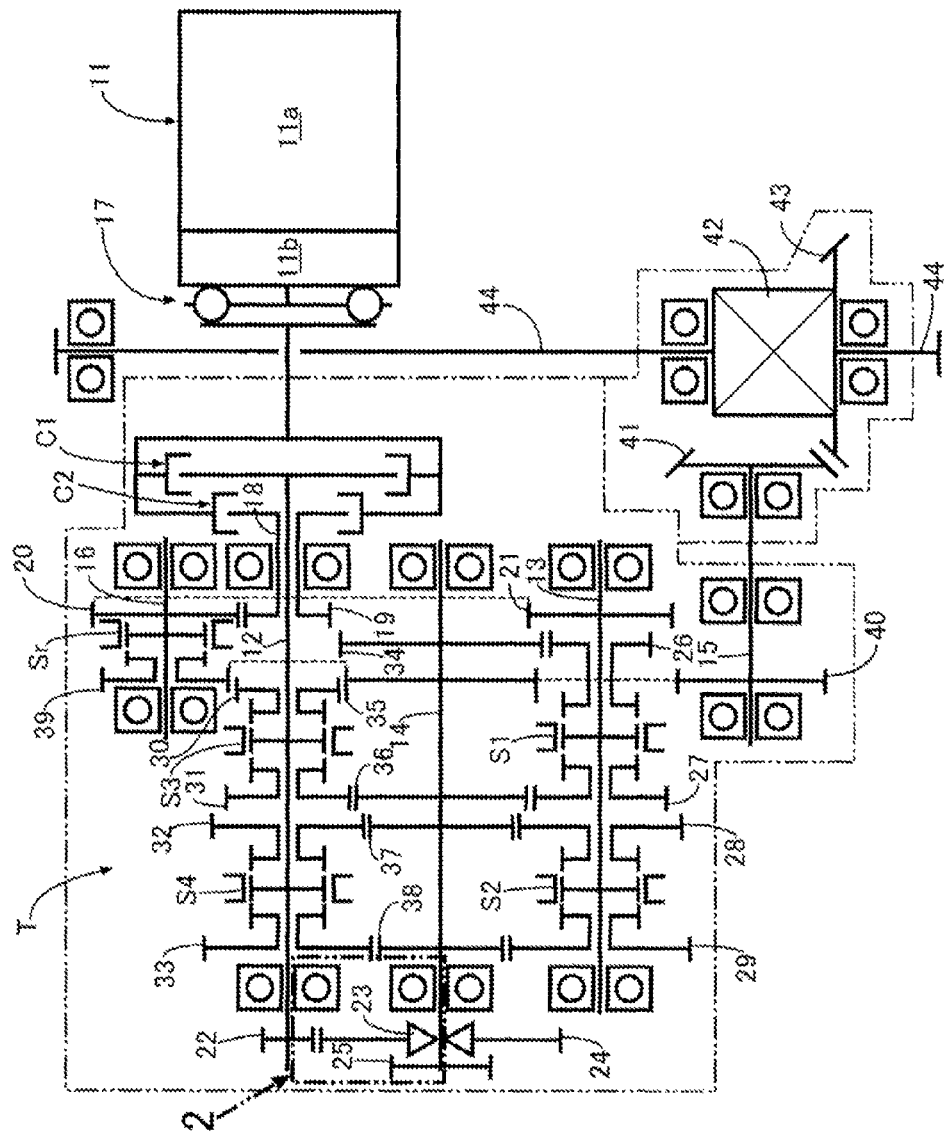
FIG. 1 is a skeleton diagram of a twin-clutch type transmission.

Hereinafter, an embodiment of the present invention will be described based on FIG. 1 and FIG. 2.

As shown in FIG. 1, a twin-clutch type transmission T with nine forward speeds and one rearward speed, that is connected to a drive source 11 in which an engine 11a and a motor generator 11b are disposed serially, includes a main shaft 12, a secondary shaft 13, a countershaft 14, an output shaft 15 and an idle shaft 16 that are disposed parallel with one another. A first clutch C1 and a second clutch C2 are coaxially connected to the drive source 11 via a damper 17. When the first clutch C1 is engaged, drive force of the drive source 11 is transmitted to the main shaft 12, whereas when the second clutch C2 is engaged, the drive force of the drive source 11 is transmitted to an input shaft 18 that is fitted to an outer periphery of the main shaft 12 relatively rotatably.

A drive gear 19 fixedly provided at the input shaft 18 is meshed with an idle gear 20 that is fixedly provided at the idle shaft 16, and the idle gear 20 is meshed with a driven gear 21 that is fixedly provided at the secondary shaft 13. Accordingly, when the second clutch C2 is engaged, the drive force from the drive source 11 is transmitted to the secondary shaft 13.

A first speed drive gear 22 is fixedly provided at a shaft end of the main shaft 12, and the first speed drive gear 22 is meshed with a first speed driven gear 24 that is supported at the countershaft 14, via a one-way clutch 23. Further, a parking gear 25 is fixedly provided at a position adjacent to the one-way clutch 23 in the countershaft 14.

At the secondary shaft 13, a second speed drive gear 26, a fourth speed drive gear 27, a sixth speed drive gear 28 and an eighth speed drive gear 29 are relatively rotatably supported. The second speed drive gear 26 and the fourth speed drive gear 27 can be selectively coupled to the secondary shaft 13 via a second speed-fourth speed synchronizing device S1, and the sixth speed drive gear 28 and the eighth speed drive gear 29 can be selectively coupled to the secondary shaft 13 via a sixth speed-eighth speed synchronizing device S2.

A third speed drive gear 30, a fifth speed drive gear 31, a seventh speed drive gear 32 and a ninth speed drive gear 33 are relatively rotatably supported at the main shaft 12. The third speed drive gear 30 and the fifth speed drive gear 31 can be selectively coupled to the main shaft 12 via a third speed-fifth speed synchronizing device S3. The seventh speed drive gear 32 and the ninth speed drive gear 33 can be selectively coupled to the main shaft 12 via a seventh speed-ninth speed synchronizing device S4.

A second speed driven gear 34, a third speed driven gear 35, a fourth speed-fifth speed driven gear 36, a sixth speed-seventh speed driven gear 37 and an eighth speed-ninth speed driven gear 38 are fixedly provided at the countershaft 14. The second speed driven gear 34 is meshed with the second speed drive gear 26, and the third speed driven gear 35 is meshed with the third speed drive gear 30. The fourth speed-fifth speed driven gear 36 is meshed with the fourth speed drive gear 27 and the fifth speed drive gear 31. The sixth speed-seventh speed driven gear 37 is meshed with the sixth speed drive gear 28 and the seventh speed drive gear 32. The eighth speed-ninth speed driven gear 38 is meshed with the eighth speed drive gear 29 and the ninth speed drive gear 33.

A reverse idle gear 39 which is relatively rotatably supported at the idle shaft 16 and can be coupled to it via a reverse synchronizing device Sr is meshed with the third speed driven gear 35 which is fixedly provided at the main shaft 12.

A final driven gear 40 fixedly provided at the output shaft 15 is meshed with the third speed driven gear 35 which is fixedly provided at the main shaft 12. A first bevel gear 41 that is fixedly provided at the output shaft 15 is meshed with a second bevel gear 43 that is fixedly provided at a case of a differential gear 42, and left and right axles 44 extend in a direction orthogonal to the main shaft 12 from the differential gear 42 and are connected to driven wheels.

Accordingly, when the first clutch C1 is engaged, in a state in which the second speed-fourth speed synchronizing device S1, the sixth speed-eighth speed synchronizing device S2, the third speed-fifth speed synchronizing device S3 and the seventh speed-ninth speed synchronizing device S4 are brought into neutral positions, and the reverse synchronizing device Sr is brought into a position to which the reverse synchronizing device Sr is rightward moved, a first speed gear stage is established.

When the second clutch C2 is engaged, in a state in which the second speed-fourth speed synchronizing device S1 is moved rightward and the second speed drive gear 26 is coupled to the secondary shaft 13, a second speed gear stage is established. When the second clutch C2 is engaged, in a state in which the second speed-fourth speed synchronizing device S1 is moved leftward and the fourth speed drive gear 27 is coupled to the secondary shaft 13, a fourth speed gear stage is established. When the second clutch C2 is engaged, in a state in which the sixth speed-eighth speed synchronizing device S2 is moved rightward, and the sixth speed drive gear 28 is coupled to the secondary shaft 13, a sixth speed gear stage is established. When the second clutch C2 is engaged, in a state in which the sixth speed-eighth speed synchronizing device S2 is moved leftward and the eighth speed drive gear 29 is coupled to the secondary shaft 13, an eighth speed gear stage is established.

When the first clutch C1 is engaged, in a state in which the third speed-fifth speed synchronizing device S3 is moved rightward and the third speed drive gear 30 is coupled to the main shaft 12, a third speed gear stage is established. When the first clutch C1 is engaged, in a state in which the third speed-fifth speed synchronizing device S3 is moved leftward and the fifth speed drive gear 31 is coupled to the main shaft 12, a fifth speed gear stage is established. When the first clutch C1 is engaged, in a state in which the seventh speed-ninth speed synchronizing device S4 is moved rightward and the seventh speed drive gear 32 is coupled to the main shaft 12, a seventh speed gear stage is established. When the first clutch C1 is engaged, in a state in which the seventh speed-ninth speed synchronizing device S4 is moved leftward and the ninth speed drive gear 33 is coupled to the main shaft 12, a ninth speed gear stage is established.

Further, when the second clutch C2 is engaged, in a state in which the reverse synchronizing device Sr is moved leftward and the reverse idle gear 39 is coupled to the idle shaft 16, a reverse gear stage is established.

The one-way clutch 23 transmits drive force to the countershaft 14 side from the main shaft 12 side by being engaged at a time of establishment of the first speed gear stage, but automatically releases engagement when the third, fifth, seventh and ninth speed gear stages are established, because a number of rotations of the countershaft 14 exceeds a number of rotations transmitted from the main shaft 12 side, and thus, occurrence of torque lock is prevented. When the second, fourth, sixth and eighth speed gear stages are established, the main shaft 12 does not transmit torque, and therefore, the one-way clutch 23 automatically releases engagement. Further, when the reverse gear stage is established, the countershaft 14 reversely rotates and the one-way clutch 23 is engaged, but the main shaft 12 to which the torque is transmitted via the one-way clutch 23 is in an idling state, and therefore, no problem arises.

FIG. 2 is a detailed view of a periphery of the one-way clutch 23 which supports the first speed driven gear 24 at the countershaft 14.

The parking gear 25 includes a tubular boss portion 25a that is spline-fitted on an outer periphery of the countershaft 14, and a gear main body portion 25b that extends outward in a radial direction from a left end of the boss portion 25a. On an outer periphery of a right end of the boss portion 25a of the parking gear 25, the first speed driven gear 24 is relatively rotatably supported via a ball bearing 51, and the one-way clutch 23 is disposed between an outer peripheral surface 25c of the boss portion 25a, and an inner peripheral surface 24a of the first speed driven gear 24.

The one-way clutch 23 includes a plurality of rollers 52 that are clamped between the outer peripheral surface 25c of the boss portion 25a and the inner peripheral surface 24a of the first speed driven gear 24, retainers 53 that hold the plurality of rollers 52 at predetermined intervals, and an annular blocking plate 54 that covers left end surfaces of the rollers 52. A right end of the one-way clutch 23 is locked to a step portion 24b that is formed at a right end of the inner peripheral surface 24a of the first speed driven gear 24, and a left end of the one-way clutch 23 is locked to a clip 55 that is fitted to a left end of the inner peripheral surface 24a of the first speed driven gear 24.

At a casing 56, a left end portion of the countershaft 14 is supported via a ball bearing 57, and a left end portion of the main shaft 12 is supported via a ball bearing 58. The ball bearing 57 includes an inner race 57a that is press-fitted to an outer peripheral surface of the countershaft 14, an outer race 57b that is press-fitted to an inner peripheral surface of the casing 56, and a plurality of balls 57c that are disposed between the inner race 57a and the outer race 57b. Further, the ball bearing 51 includes an inner race 51a that is press-fitted in the boss portion 25a of the parking gear 25, an outer race 51b that is press-fitted to the inner peripheral surface 24a of the first speed driven gear 24, and a plurality of balls 51c that are disposed between the inner race 51a and the outer race 51b.

Between the ball bearing 51 and the ball bearing 57, an annular washer 59 is disposed to surround the outer periphery of the countershaft 14. An inner peripheral side of the washer 59 is clamped between the inner race 51a of the ball bearing 51 and the inner race 57a of the ball bearing 57. A seal surface 59a formed at a left end at an outer peripheral side of the washer 59 abuts on the outer race 51b of the ball bearing 51.

Inside a casing 60, oil paths 60a, 60b that are connected to an oil pump not illustrated are formed, and the oil paths 60a, 60b communicate with an oil path 14a that is formed in an axial direction inside the countershaft 14. The oil path 14a of the countershaft 14 communicates with an inner peripheral portion of the one-way clutch 23 via an oil hole 14b that penetrates through the countershaft 14 in a radial direction, and an oil hole 25d that penetrates through the boss portion 25a of the parking gear 25 in the radial direction. Further, the oil path 14a of the countershaft 14 communicates with a space 61 between a lubricating oil guide surface 59c that is formed at a left side surface of the washer 59 and a right side surface of the inner race 51a of the ball bearing 51, via a cutout 59b that is formed at a left end at the inner peripheral side of the washer 59. The space 61 communicates with a right end portion of the one-way clutch 23 via a gap between the inner race 51a and the outer race 51b of the ball bearing 51.

A space 63 that is formed between the left end of the one-way clutch 23 and a right side surface of the main body portion 25b of the parking gear 25 communicates with an internal space of the casing 60 via a cutout 24c formed at a left end of the first speed driven gear 24.

Next, an operation of the embodiment of the present invention including the above described configuration will be described.

Part of the lubricating oil which is supplied from the oil pump not illustrated to the oil path 14a of the countershaft 14 through the oil paths 60a, 60b of the casing 60 passes from an inner side to an outer side in the radial direction through the oil hole 14b of the countershaft 14 and the oil hole 25d of the boss portion 25a of the parking gear 25, and then flows into the inner peripheral portion in a center in the axial direction of the one-way clutch 23. Further, the other part of the lubricating oil which is supplied to the oil path 14a of the countershaft 14 passes from the inner side to the outer side in the radial direction through the oil hole 14c of the countershaft 14 and the cutout 59b of the washer 59, and flows into the space 61 sandwiched by the ball bearing 51 and the washer 59.

The lubricating oil which flows to the outer side in the radial direction in the space 61 by centrifugal force is guided by the lubricating oil guide surface 59c of the washer 59 to change a direction thereof to a leftward direction in the axial direction, passes through a gap between the inner race 51a and the outer race 51b of the ball bearing 51 to flow into the space 62, and flows into the right end inner peripheral portion of the one-way clutch 23 from the space 62. As above, the washer 59 is provided with the lubricating oil guide surface 59c that guides the lubricating oil toward the one-way clutch 23, and therefore, the lubricating oil which is supplied from an inside of the countershaft 14 can be efficiently guided toward the one-way clutch 23.

Since a left end portion of the one-way clutch 23 is blocked by the blocking plate 54, and a gap a is formed at only an inner portion in the radial direction of the blocking plate 54, the lubricating oil inside the one-way clutch 23 passes through the gap a to flow into the space 63, and from the space 63, the lubricating oil passes through the cutout 24c at the left end of the first speed driven gear 24 to be discharged into the internal space of the casing 60. In this way, since the lubricating oil is supplied to the one-way clutch 23 which is located at the outer side in the radial direction, from the oil hole 25d and the space 62 which are located at the inner side in the radial direction, and from the one-way clutch 23, the lubricating oil is discharged from the gap a which is located at the inner side in the radial direction, the lubricating oil which is urged to the outer side in the radial direction by the centrifugal force is held inside the one-way clutch 23 and a lubricating effect can be enhanced.

Further, the first speed drive gear 22 and the first speed driven gear 24 are formed of helical gears, and therefore, during traveling in the first speed gear stage, the first speed driven gear 24 receives meshing reaction force in a rightward direction in the drawing from the first speed drive gear 22. As shown by an arrow in FIG. 2, the meshing reaction force is supported by the countershaft 14 via the outer race 51b of the ball bearing 51, the seal surface 59a at an outer end in the radial direction of the washer 59, and the inner race 57a of the ball bearing 57 from the first speed driven gear 24, and therefore, support rigidity of the first speed driven gear 24 with respect to the meshing reaction force can be enhanced.

Further, when torque is transmitted between the first speed drive gear 22 and the first speed driven gear 24, load on the one-way clutch 23 which supports the first speed driven gear 24 at the countershaft 14 increases and an amount of a required lubricating oil increases, but the outer race 51b of the ball bearing 51 is firmly pressed against the seal surface 59a of the washer 59 due to increase in the meshing reaction force which is rightward in the drawing and is received by the first speed driven gear 24, and therefore, more lubricating oil can be supplied to the one-way clutch 23 by preventing leakage of the lubricating oil from the seal surface 59a.

Further, the one-way clutch 23 is supported on the outer periphery of the boss portion 25a of the parking gear 25 which is fixed to the outer periphery of the countershaft 14, and therefore, a diameter of the one-way clutch 23 can be increased as compared with a case of directly supporting the one-way clutch 23 on the outer periphery of the countershaft 14. Thereby, the number of the rollers 52 of the one-way clutch 23 is increased, and load which is applied to the rollers 52 is reduced, whereby increase of a torque transmission capacity and durability, of the one-way clutch 23 are enabled.

The embodiment of the present invention is described above, and various design changes of the present invention can be made within the range without departing from the gist of the present invention.

For example, in the embodiment, the one-way clutch 23 and the ball bearing 51 are indirectly supported on the outer periphery of the countershaft 14 via the parking gear 25, but the one-way clutch 23 and the ball bearing 51 can be directly supported on the outer periphery of the countershaft 14 without a medium of the parking gear 25.

Further, in the embodiment, the one-way clutch 23 is applied to support of the first speed driven gear 24, but can be applied to support of an optional gear other than the first speed driven gear 24.

What is claimed is:

1. A lubrication structure for a transmission, comprising:
a first rotary shaft supporting a first gear;
a second rotary shaft supporting via a one-way clutch a second gear that is meshed with the first gear;
a first bearing supporting the second rotary shaft, at a casing;
a second bearing supporting the second gear, at the second rotary shaft, between the one-way clutch and the first bearing; and
a washer supported on an outer periphery of the second rotary shaft and interposed between the first bearing and the second bearing,
wherein an inner end portion in a radial direction of the washer is caused to abut on an inner race of the first bearing, a seal surface provided on an outer end in the radial direction of the washer is caused to abut on an outer race of the second bearing, and on a side surface at the second bearing side of the washer, a lubricating oil guide surface is formed, that guides lubricating oil which is supplied from an inside of the second rotary shaft, to the one-way clutch through the second bearing.

2. The lubrication structure for a transmission according to claim 1,
wherein the first gear and the second gear are helical gears, and with meshing reaction force in an axial direction which is exerted on the second gear from the first gear, the outer race of the second bearing is urged toward the seal surface of the washer.

3. The lubrication structure for a transmission according to claim 2,
wherein a cutout guiding the lubricating oil, which is supplied from the inside of the second rotary shaft, to the lubricating oil guide surface is formed at an inner end portion in a radial direction of the washer, an end portion of the one-way clutch at a side opposite from the second bearing is blocked with a blocking plate, and a gap for discharging the lubricating oil is formed at an inner end portion in a radial direction of the blocking plate.

4. The lubrication structure for a transmission according to claim 1,
wherein a cutout guiding the lubricating oil, which is supplied from the inside of the second rotary shaft, to the lubricating oil guide surface is formed at an inner end portion in a radial direction of the washer, an end portion of the one-way clutch at a side opposite from the second bearing is blocked with a blocking plate, and a gap for discharging the lubricating oil is formed at an inner end portion in a radial direction of the blocking plate.

5. The lubrication structure for a transmission according to claim 1, further comprising:
a parking gear with a boss portion fixed to the second rotary shaft,
wherein the one-way clutch is disposed between an outer peripheral surface of the boss portion and an inner peripheral surface of the second gear.

* * * * *